(12) United States Patent
Wald et al.

(10) Patent No.: US 8,046,385 B2
(45) Date of Patent: Oct. 25, 2011

(54) DATA QUALITY TRACKING

(75) Inventors: David Wald, Watertown, MA (US); Tim Wakeling, Andover, MA (US); Muhammad Arshad Khan, Sharon, MA (US)

(73) Assignee: Ab Initio Technology LLC, Lexington, MA (US)

( * ) Notice: Subject to any disclaimer, the term of this patent is extended or adjusted under 35 U.S.C. 154(b) by 458 days.

(21) Appl. No.: 12/143,362

(22) Filed: Jun. 20, 2008

(65) Prior Publication Data

US 2009/0319566 A1 Dec. 24, 2009

(51) Int. Cl.
*G06F 7/00* (2006.01)
(52) U.S. Cl. ........................................ 707/802; 707/803
(58) Field of Classification Search .................. 707/802, 707/803, 755, 765, 769
See application file for complete search history.

(56) References Cited

U.S. PATENT DOCUMENTS

| 6,725,227 | B1 | 4/2004 | Li |
| 7,456,840 | B2 | 11/2008 | Molesky et al. |
| 2004/0181554 | A1* | 9/2004 | Heckerman et al. ....... 707/104.1 |
| 2005/0246352 | A1 | 11/2005 | Moore et al. |
| 2006/0106847 | A1 | 5/2006 | Eckardt et al. |
| 2006/0218159 | A1 | 9/2006 | Murphy et al. |
| 2007/0033220 | A1 | 2/2007 | Drucker et al. |
| 2007/0112875 | A1* | 5/2007 | Yagawa ........................ 707/200 |
| 2007/0150496 | A1 | 6/2007 | Feinsmith ..................... 707/100 |
| 2007/0255741 | A1 | 11/2007 | Greiger et al. |
| 2008/0163124 | A1 | 7/2008 | Bonev et al. |
| 2008/0172629 | A1 | 7/2008 | Tien et al. |

OTHER PUBLICATIONS

International Search Report & Written Opinion issued in PCT application No. PCT/US09/66390, dated Jan. 20, 2010, 7 pages.
International Search Report & Written Opinion issued in PCT application No. PCT/US09/66394, dated Jan. 20, 2010, 6 pages.
Notification of Transmittal of the International Search Report and the Written Opinion of the International Searching Authority, or the Declaration, for Application No. PCT/US09/47735, dated Jul. 23, 2009, 6 pages.

* cited by examiner

*Primary Examiner* — Belix M Ortiz
(74) *Attorney, Agent, or Firm* — Fish & Richardson P.C.

(57) ABSTRACT

In general, a method includes determining metric values associated with data quality for one or more child nodes. Metric values are determined for a parent node based on the metric values of at least some of the child nodes, and relationships between one or more parent nodes and one or more child nodes define a hierarchy. The determination of the metric value for the parent node is repeated for multiple instances.

25 Claims, 7 Drawing Sheets

DATA QUALITY TRACKING

BACKGROUND

This description relates to data quality tracking.

Stored data sets often include data for which various characteristics are not known beforehand. For example, ranges of values or typical values for a data set, relationships between different fields within the data set, or functional dependencies among values in different fields, may be unknown. Data profiling can involve examining a source of a data set in order to determine such characteristics. One use of data profiling systems is to determine a measure of data quality for either a single data object, or for an entire dataset based on the results of data profiling.

SUMMARY

In one aspect, in general, a method includes determining metric values associated with data quality for one or more child nodes. Metric values are determined for a parent node based on the metric values of at least some of the child nodes, and relationships between one or more parent nodes and one or more child nodes define a hierarchy. The determination of the metric value for the parent node is repeated for multiple instances.

Aspects can include one or more of the following features. The one or more child nodes used in determining the metric value for the parent node have no child nodes. Profiling information is generated that represents characteristics of data represented by the child and parent nodes. The metric values for the child nodes are based on the profiling information. The arrangement of the hierarchy is specified by a user. A user specifies which data fields within the profiling information will affect the determination of the metric values. A user selects one or more previously-constructed factors to affect the determination of the metric values. The metric values and the metric value are represented as a number from 0 to 100. One or both of the metric values for the one or more child nodes or the metric value for the parent node is displayed for each of the multiple instances as a function of the time on a continuous line chart. The continuous line chart is automatically generated based on the profiling information. The chart indicates a change in the rules governing the determination of the metric values. The chart indicates a change in the metric values used in the determination of the metric value for the parent node.

In another aspect, in general, a computer-readable medium stores executable instructions for use in obtaining a value from a device signal, the instructions for causing a computer to determine metric values for one or more child nodes. A metric value is determined for a parent node based on the metric values of at least some of the child nodes, wherein relationships between one or more parent nodes and one or more child nodes define a hierarchy. The determination of the metric value is repeated for the parent node for multiple instances.

Aspects can include one or more of the following features. The one or more child nodes used in determining the metric value for the parent node have no child nodes. Profiling information is generated that represents characteristics of data represented by the child and parent nodes. The metric values for the child nodes are based on the profiling information. The arrangement of the hierarchy is specified by a user. A user specifies which data fields within the profiling information will affect the determination of the metric values. A user selects one or more previously-constructed factors to affect the determination of the metric values. The metric values and the metric value are represented as a number from 0 to 100. The one or both of the metric values for the one or more child nodes or the metric value for the parent node is displayed for each of the multiple instances as a function of the time on a continuous line chart. The continuous line chart is automatically generated based on the profiling information. The chart indicates a change in the rules governing the determination of the metric values. The chart indicates a change in the metric values used in the determination of the metric value for the parent node.

In another aspect, in general, a system includes means for determining metric values for one or more child nodes. A system further includes means for determining a metric value for a parent node based on the metric values of at least some of the child nodes, wherein relationships between one or more parent nodes and one or more child nodes define a hierarchy. A system further includes means for repeating the determination of the metric value for the parent node for multiple instances.

Other features and advantages are apparent from the following description, and from the claims.

DESCRIPTION

Figure 1:
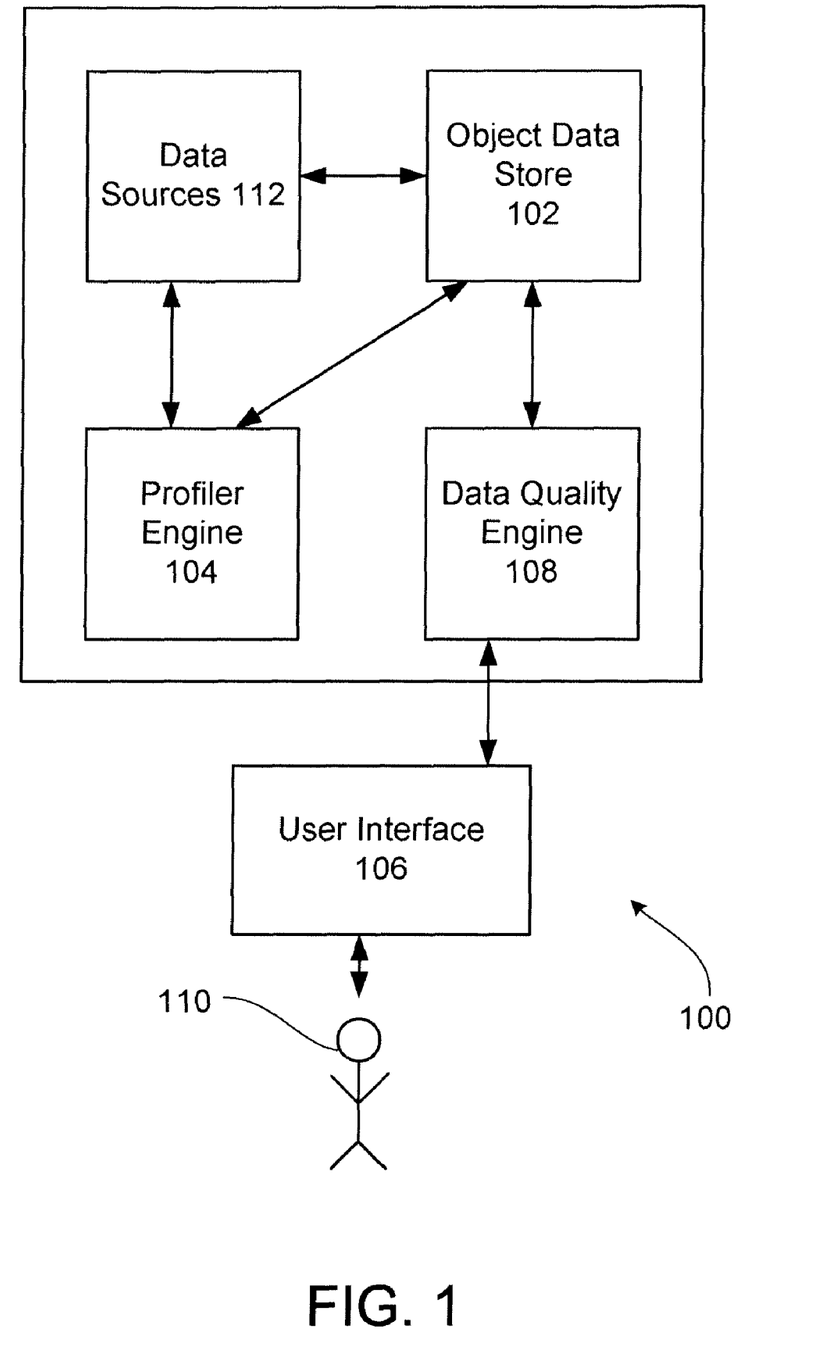
FIG. 1 is a block diagram of a system that includes a profiler engine and a data quality engine.

Referring to FIG. 1, a data processing system 100 includes a profiler engine 104 which is used to process data from an object data store 102. The data objects in the object data store 102 can include, for example, objects associated with a field of a record as defined by a record format. Through a user interface 106, a user 110 can cause a data quality engine 108 to access stored profiling information (sometimes referred to as a "field profile") associated with the objects within object data store 102. The data quality engine can generate information related to data quality (sometimes referred to as "metric values" or "data quality metrics") for objects stored in the object data store 102, and can display the generated information to a user through the user interface 106.

Data sources 112 in general include a variety of individual data sources, each of which may have unique storage formats and interfaces (for example, database tables, spreadsheet files, flat text files, or a native format used by a mainframe). The individual data sources may be local to the system, for example, being hosted on the same computer system, or may be remote to the system, for example, being hosted on a remote computer that is accessed over a local or wide area data network.

Object data store 102 includes information related to data in data sources 112. Such information can include record formats as well as specifications for determining the validity of field values in those records. Relationships among different fields of records appearing within the data sources 112 (e.g., primary-foreign key relationships) can be represented in a variety of ways. For example, hierarchical relationships that exist among the data objects in the object data store 102 may be represented as a hierarchy.

Object data store 102 can be used to store initial information about a data set in data sources 112 to be profiled, as well as information obtained about such a data set. Field profiles derived from that data set by the profiling process may also be stored in object data store 102.

The system 100 includes a profiler engine 104, which reads data from the object data store 102. When first reading data from data sources 112, the profiler engine 104 typically starts with some initial format information about records in that data source. (Note that in some circumstances, even the record structure of the data source may not be known). The initial information about records can include the number of bits that represent a distinct value (e.g., 16 bits (=2 bytes)) and the order of values, including values associated with record fields and values associated with tags or delimiters, and the type of value (e.g., string, signed/unsigned integer) represented by the bits. This information about records of a data source is specified in a data manipulation language (DML) file that is stored in object data store 102. The profiler engine 104 can use predefined DML files to automatically interpret data from a variety of common data system formats (e.g., SQL tables, XML files, CSV files) or use a DML file obtained from the object data store 102 describing a customized data system format. The profiler engine 104 may also generate DML files for user-supplied SQL statements and XML schemas.

Partial, possibly inaccurate, initial information about records of a data source may be available to the system 100 prior to the profiler engine 104 initial reading of the data. For example, a COBOL copy book associated with a data source may be available as stored data, or entered by a user 110 through a user interface 106. In general, a field profile refers to the collection of statistics about a data object produced by profiling a dataset containing that data object. A field profile typically includes information about the date at which the profile was computed.

As the profiler engine 104 reads records from a data source, it computes statistics and other descriptive information that reflect the contents of the data set. The profiler engine 104 then writes those statistics and descriptive information in the form of a "profile" into the object data store 102 which can then be examined through the user interface 106 or any other module with access to the object data store 102. In some cases, the statistics in the profile include a histogram of values in each field, maximum, minimum, and mean values, and samples of the least common and most common values, for example.

The statistics obtained by reading from the data source can be used for a variety of uses. Such uses can include discovering the contents of unfamiliar data sets, building up a collection of metadata associated with a data set, examining third-party data before purchasing or using it, and implementing a quality control scheme for collected data.

The object data store 102 is able to store validation information associated with each profiled field, for example as a validation specification that encodes the validation information. Alternatively, the validation information can be stored in an external storage location and retrieved by the profiler engine 104. Before a data set is profiled, the validation information may specify a valid data type for each field. For example, if a field is a person's "title", a default valid value may be any value that is a "string" data type. A user may also supply valid values such as "Mr.", "Mrs." and "Dr." prior to profiling the data source so that any other value read by the profiler engine 104 would be identified as invalid. Information obtained from a profiling run can also be used by a user to specify valid values for a particular field. For example, the user may find that after profiling a data set the values "Ms." and "Msr." appear as common values. The user may add "Ms." as a valid value, and map the value "Msr." to the value "Mrs." as a data cleaning option. Thus, the validation information can include valid values and mapping information to permit cleaning of invalid values by mapping them onto valid values. The profiling of a data source may be undertaken in an iterative manner as more information about the data source is discovered through successive profiling runs.

The profiler engine 104 can also generate executable code to implement other modules that can access the profiled data systems. An example of such code might map a value "Msr." to "Mrs." as part of the access procedure to the data source.

The profiler engine 104 uses the object data store 102 to organize and store various metadata and profiling preferences and results in data objects. The object data store 102 may store a group of profile setup objects, each for information related to a profiling job, a group of data set objects, each for information related to a data set, and a group of DML files, each describing a particular data format. A profile setup object contains preferences for a profiling run executed by the profiler engine 104. A user 110 can enter information used to create a new profile setup object or select a pre-stored profile setup object.

The profile setup object contains a reference to a data set object. A data set setup object contains a data set locator which enables the profiler engine 104 to locate data to be profiled on one or more data systems accessible within the runtime environment. The data set locator is typically a path/filename, URL, table name, SQL select statement, or a list of path/filenames and/or URLs for a data set spread over multiple locations. The data set object can optionally contain a reference to one or more DML files.

The data set object contains a reference to a set of field objects. There is one field object for each field within the records of the data set to be profiled. Upon completion of a profiling run performed by the profiler engine 104, a data set profile is associated with the data set object corresponding to the data set that was profiled. The data set profile contains statistics that relate to the data set, such as total number of records and total number of valid/invalid records, as well as the time and data at which the data set was profiled, and versions of validation objects used in profiling.

A field object can optionally contain validation information that can be used by the profiler engine 104 to determine valid values for the corresponding field, and specify rules for cleaning invalid values (i.e., mapping invalid values onto valid values). The field object is also associated with a field profile, stored by the profiler engine upon completion of a profiling run, which contains statistics that relate to the corresponding field, such as numbers of distinct values, null values, and valid/invalid values. The field profile can also include sample values such as maximum, minimum, most common, and least common values. A complete "profile" includes the data set profile and field profiles for all of the profiled fields.

Other user preferences for a profiler run can be collected and stored in the profile setup object, or in the data set object. For example, the user can select a filter expression which can be used to limit the fields or number of values profiled, including profiling a random sample of the values (e.g., 1%).

Figure 2:
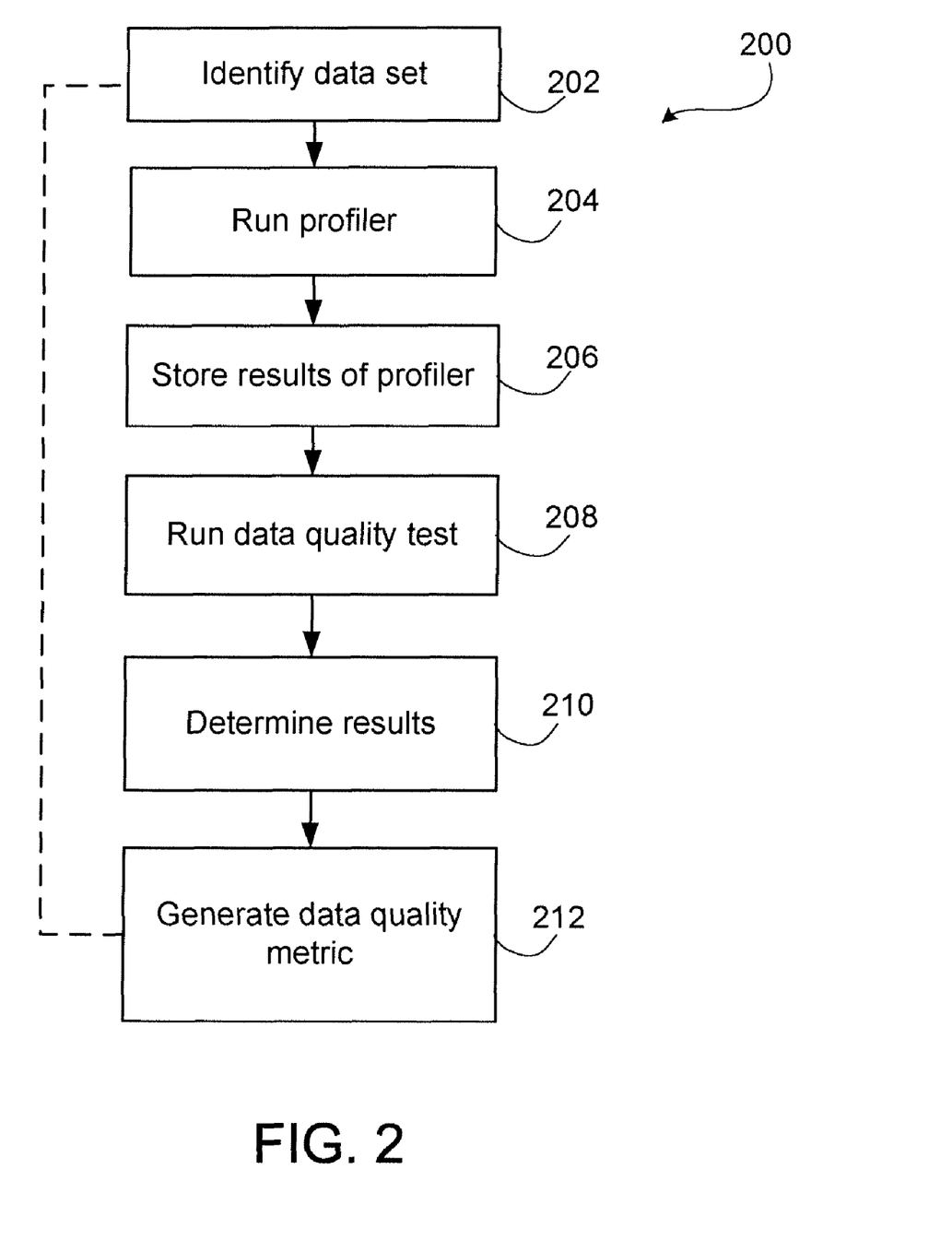
FIG. 2 is a flowchart that shows a process for generating a data quality metric for a dataset.

FIG. 2 shows a flowchart for an example of a procedure 200 for profiling a data set to test its quality for any of a variety of purposes including, for example, before transforming and loading it into a data store. The procedure 200 can be performed automatically or manually. Rules for testing the quality of a data set can come from prior knowledge of the data set, and/or from results of a profiling procedure such as procedure 200 performed on a similar data set (e.g., a data set from the same source as the data set to be tested). These rules can also be customized by a user (discussed in detail below). This procedure 200 can be used by a business, for example, to profile a periodic (e.g., monthly) data feed sent from a business partner before importing or processing the data. This would enable the business to detect "bad" data (e.g., data with a percentage of invalid values higher than a threshold) so it doesn't "pollute" an existing data store by actions that may be difficult to undo.

The procedure 200 first identifies 202 a data set to be tested on one or more data systems accessible within the runtime environment. The procedure 200 then runs 204 a profile on the data set (or a subset of the data set) and stores 206 a field profile in a location such as an object data store 102 (FIG. 1). The procedure performs 208 a quality test based on results of the profile. For example, a percentage of occurrences of a particular common value in the data set can be compared with a percentage of occurrences of the common value in a prior data set (based on a prior profiling run), and if the percentages differ from each other by more than 10%, the quality test fails. This quality test could be applied to a value in a series of data sets that is known to occur consistently (within 10%). The procedure 200 determines 210 the results of the quality test, and uses a data quality metric (also called a "data quality measure") to generate a data quality metric value that represents the quality of the tested data. The procedure can then repeat by identifying 202 another data set or the same data set at a different time.

In some examples, the procedure 200 can be applied to data objects whose metric values are related according to a hierarchy, as described in more detail below. In determining a data quality metric value for a data object (or a group of data objects), the system calculates a single value (e.g., in the range of 0-100) that indicates some measure of data quality. The calculation of the data quality metric is based on a function that is applied to the field profile for the data object.

Figure 3:
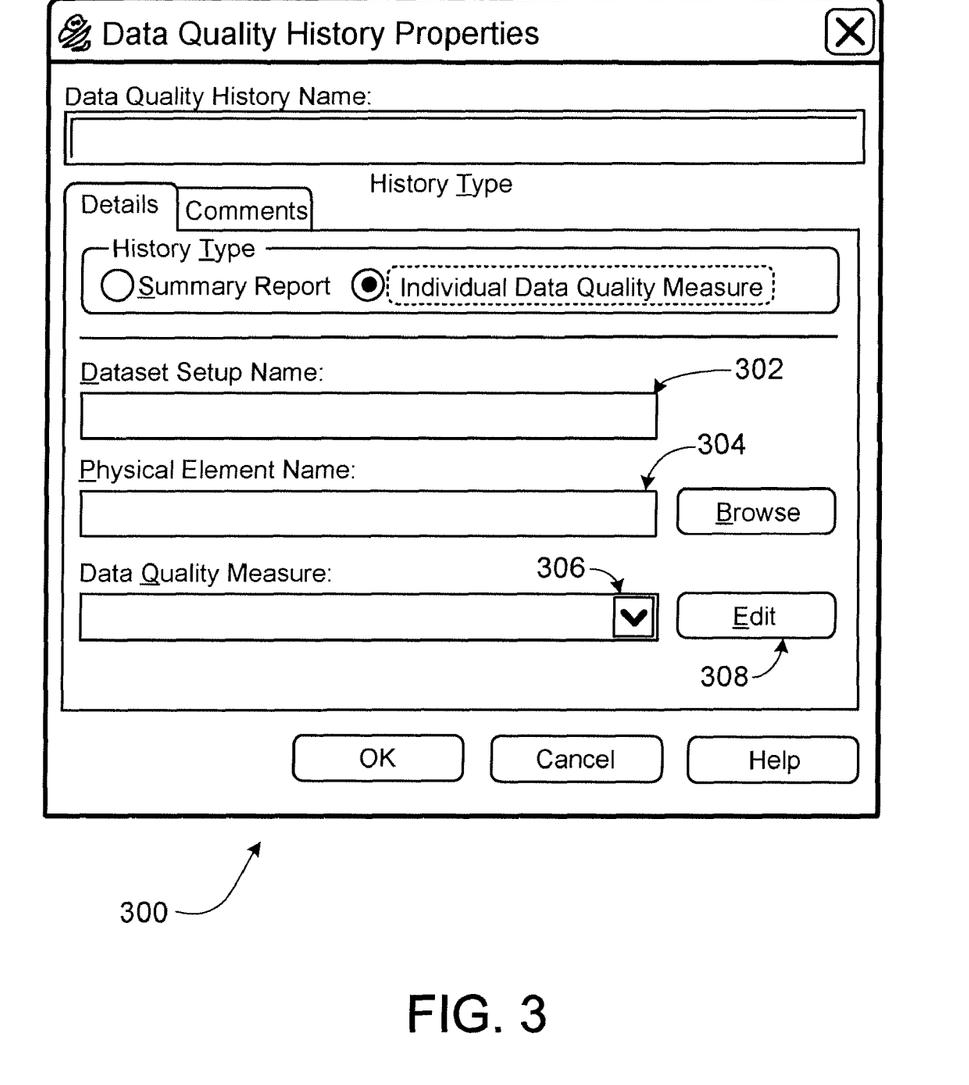
FIG. 3 shows an example of a graphical user interface.

FIG. 3 shows an example of a graphical user interface 300 for defining an individual data quality metric. The graphical user interface 300 includes the name of the data object 304 (called "Physical Element Name"), and the name of the dataset 302 of which the data object is a part. The drop-down menu 306 gives the user an option of using simple, previously-constructed measures (called a "Data Quality Measure") to define or partially define the data quality metric to be used to generate a data quality metric value; for example, the percent of values found in a field profile that was valid. The Edit button 308 allows a user to define custom expressions via an expression editor that shows an input record including all the data fields contained within a field profile. In this way, a user can customize functions for calculating data quality metric values.

Because a field profile can contain information regarding the relationship between two data objects, it is possible to define data quality metrics in terms of such cross-field information. For example, one could define the quality of a data object in terms of its percentage overlap with another data object. Also, multiple data quality metrics may be defined in terms of a single data object if there are multiple criteria by which to describe the validity of an element.

Figure 4:
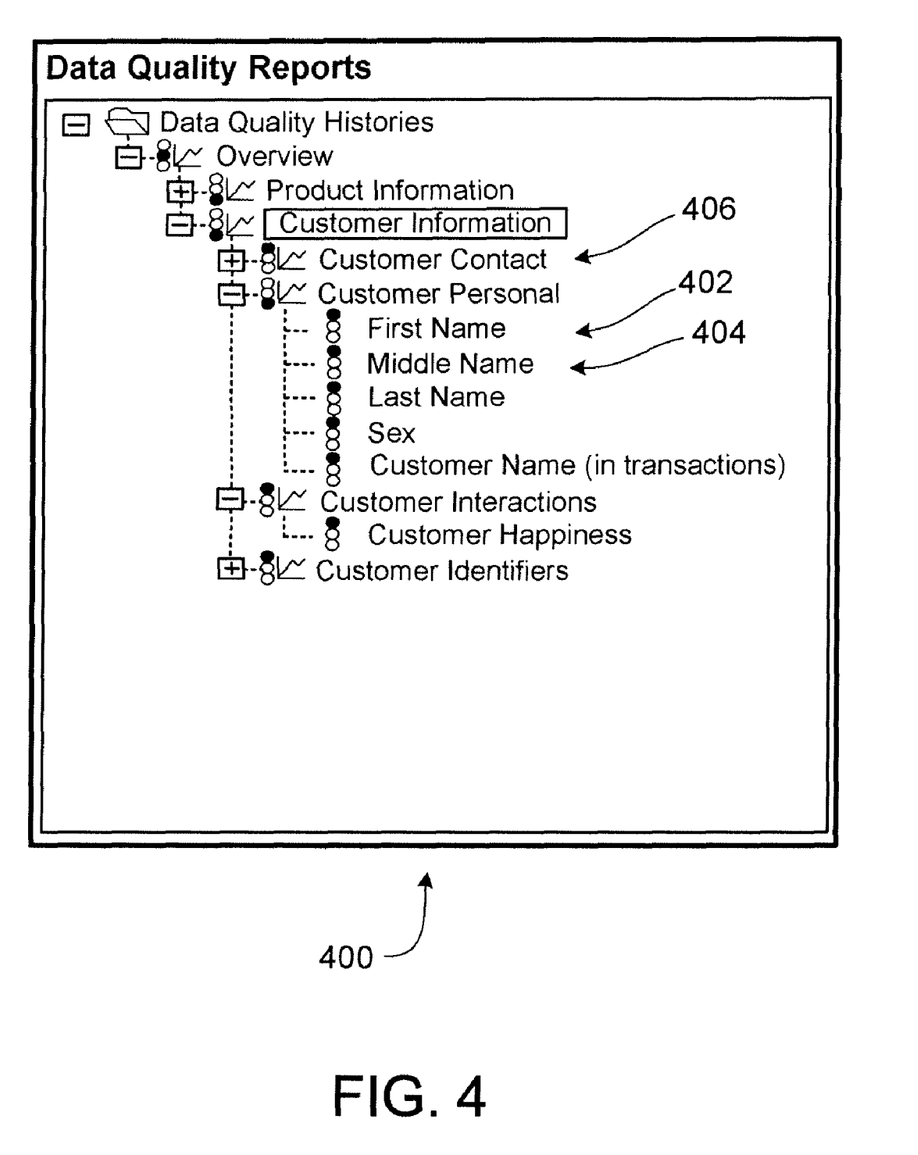
FIG. 4 an example of a hierarchy.

FIG. 4 shows an arrangement of metric values. In this arrangement, the metric values are organized in a hierarchy 400 that includes both parent nodes (e.g., the "Customer Personal" node 402) and child nodes (e.g., the "First Name" node 404). It is possible for a parent node to be both a parent node and a child node. For example, the "Customer Personal" node 402 is a parent node with regard to the "First Name" node 404, but is a child node of the "Customer Information" node 406. In this arrangement, the "First Name" node 404 is also a "leaf node" in that it has no child nodes. The hierarchical relationship among the nodes representing the metric values may be independent from any hierarchical relationship that may exist among the data objects whose quality is measured by the metric values.

For the various nodes in the hierarchy, data quality metrics can be viewed and arranged by a user 110 (FIG. 1) through a user interface 106 (FIG. 1). In some examples, such as the example of FIG. 4, data elements can be added and deleted through a special interface, as well as "dragged and dropped" from one location in the hierarchy to another. The arrangement of a hierarchy may correspond to any hierarchical structure, such as the hierarchy of responsibility within an organization. Data quality histories, which track data quality metric values over time, as described in more detail below, can be calculated based on stored historical data quality metric values for a given data object (or based on stored historical profiling information from which data quality metric values can be calculated). The calculation of data quality histories given a hierarchy of nodes and their associated metrics can be performed as views and reports are requested; on demand or a combination of the two.

Figure 5:
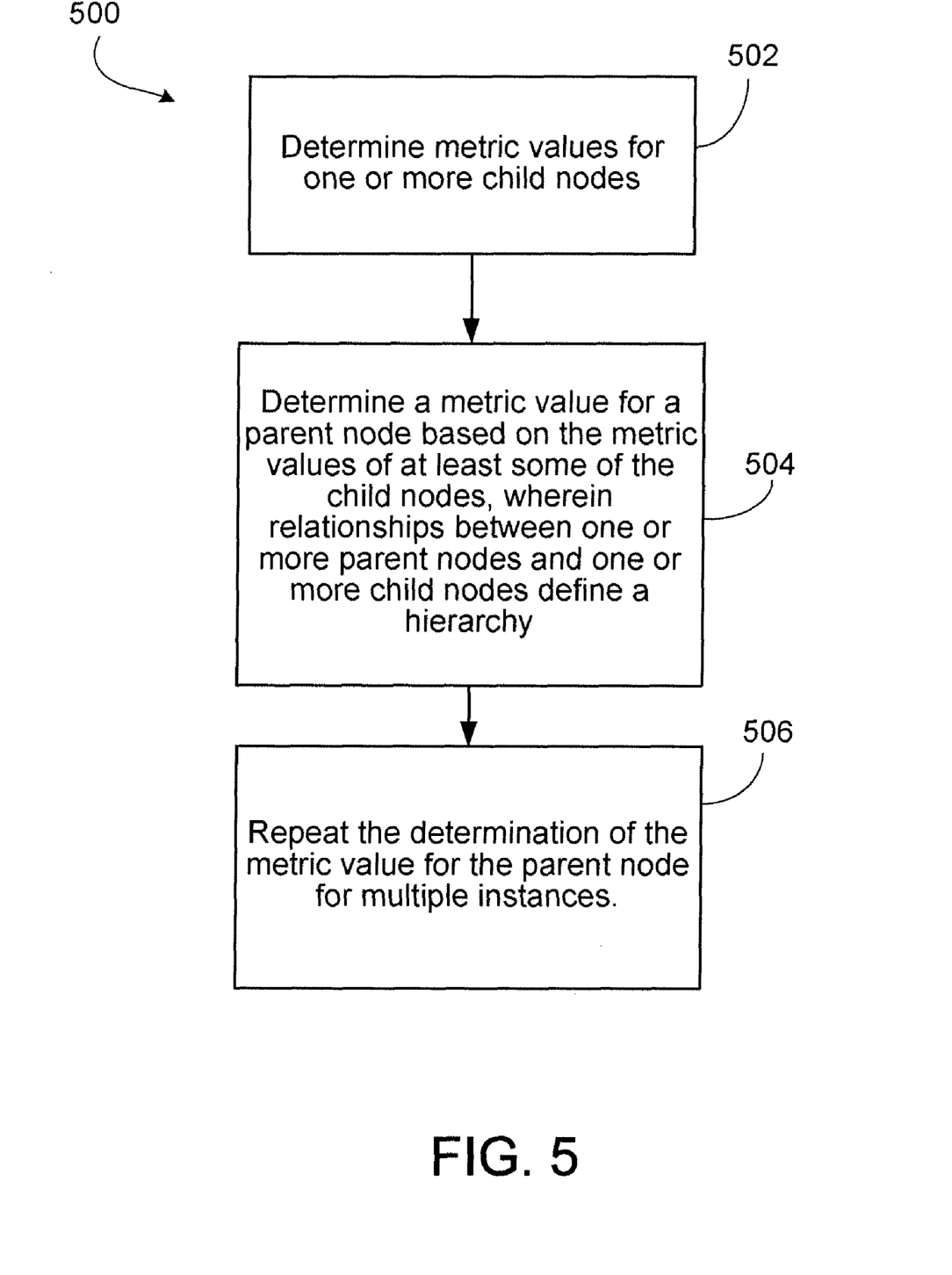
FIG. 5 is a flowchart that shows a process for generating a value representative of profiling information.

In some examples, hierarchies may be used in the calculation of data quality metrics. For instance, to calculate a data quality metric value (or "metric value") for a parent node, a procedure 500 determines 502 metric values for one or more child nodes. The hierarchy contains at least one child node and at least one parent node. The process 500 determines 504 a metric value for a parent node based on the metric values of at least some of the child nodes. The relationships between the parent nodes and the child nodes define a hierarchy. This hierarchy may resemble the example of FIG. 4, and may be customizable by a user. In some examples, the hierarchy may be determined before any data quality metrics are calculated; that is, step 504 may precede step 502 in some implementations. The process 500 repeats 506 determining the metric value for the parent node for multiple instances.

Given an individual data quality metric and a collection of field profiles for a corresponding physical element (or some other way of computing data quality metric values) a time series of metric values can be produced. The resulting time series represents the history of that metric value, and can either be computed on an as-needed basis or stored for later use in the object data store and associated with the representation of the metric specification. In either case, it can then be charted in a data profiler user interface.

Figure 6A:
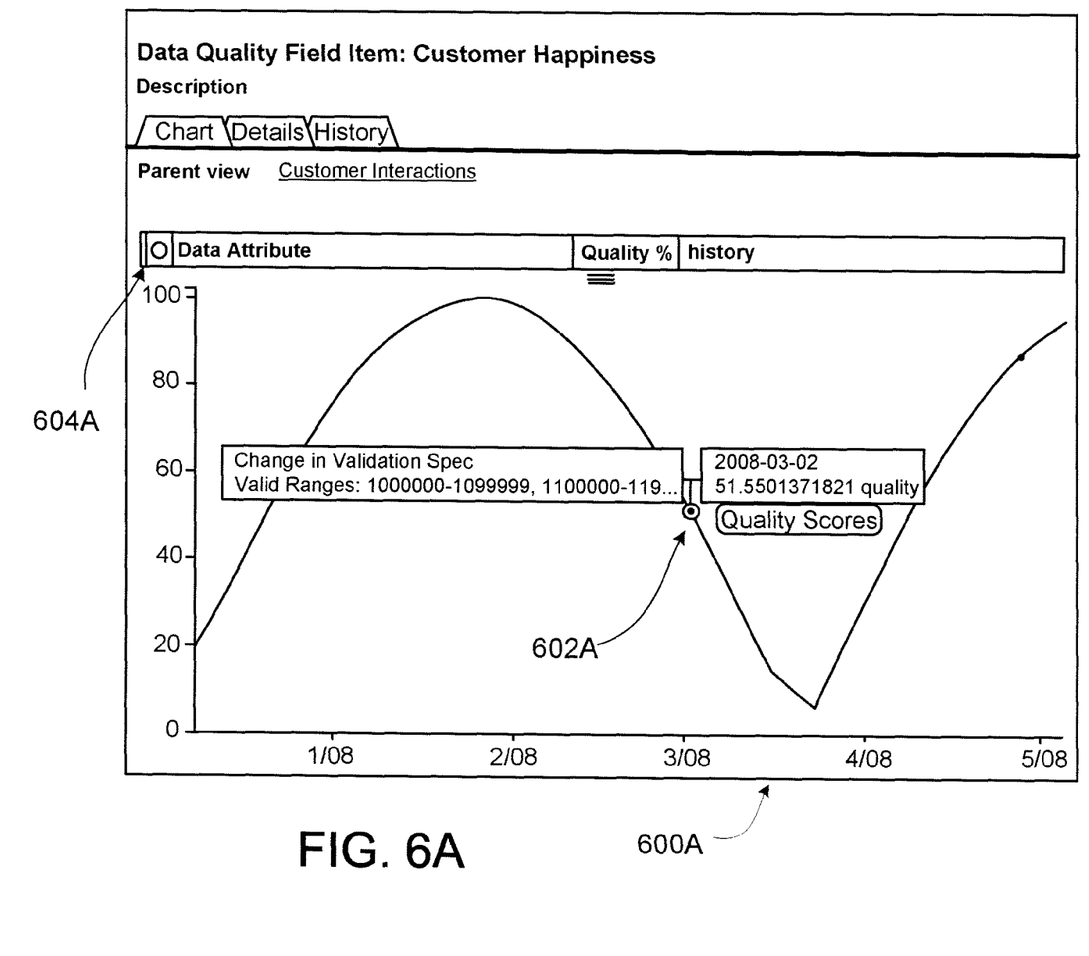
FIG. 6A is a chart based on metric values vs. time.

An example of a chart plotting a data quality metric value vs. time is shown in FIG. 6A. The chart 600A shows the time series of computed metric values for the metric "Customer Happiness." If a user moves a cursor over a point 602A in the chart 600A, the date and computed quality value are displayed for that point. Points at which the validation specification changed from its previous value are marked by dark points on the chart, and moving a cursor over those will show the change in the validation specification. Points on the chart may also show instances where the metric values for the child nodes used in the calculation have changed; that is, when different child node metric values are used in the determination, the chart would identify the point at which the change occurred. The chart can also identify points at which other elements of the metric value computation have changed, such as the definition of the metric used to compute the values. In the upper left of the chart is a colored dot 604A summarizing the latest data quality as "good," "needs attention," or "bad" (green, yellow, or red respectively).

Figure 6B:
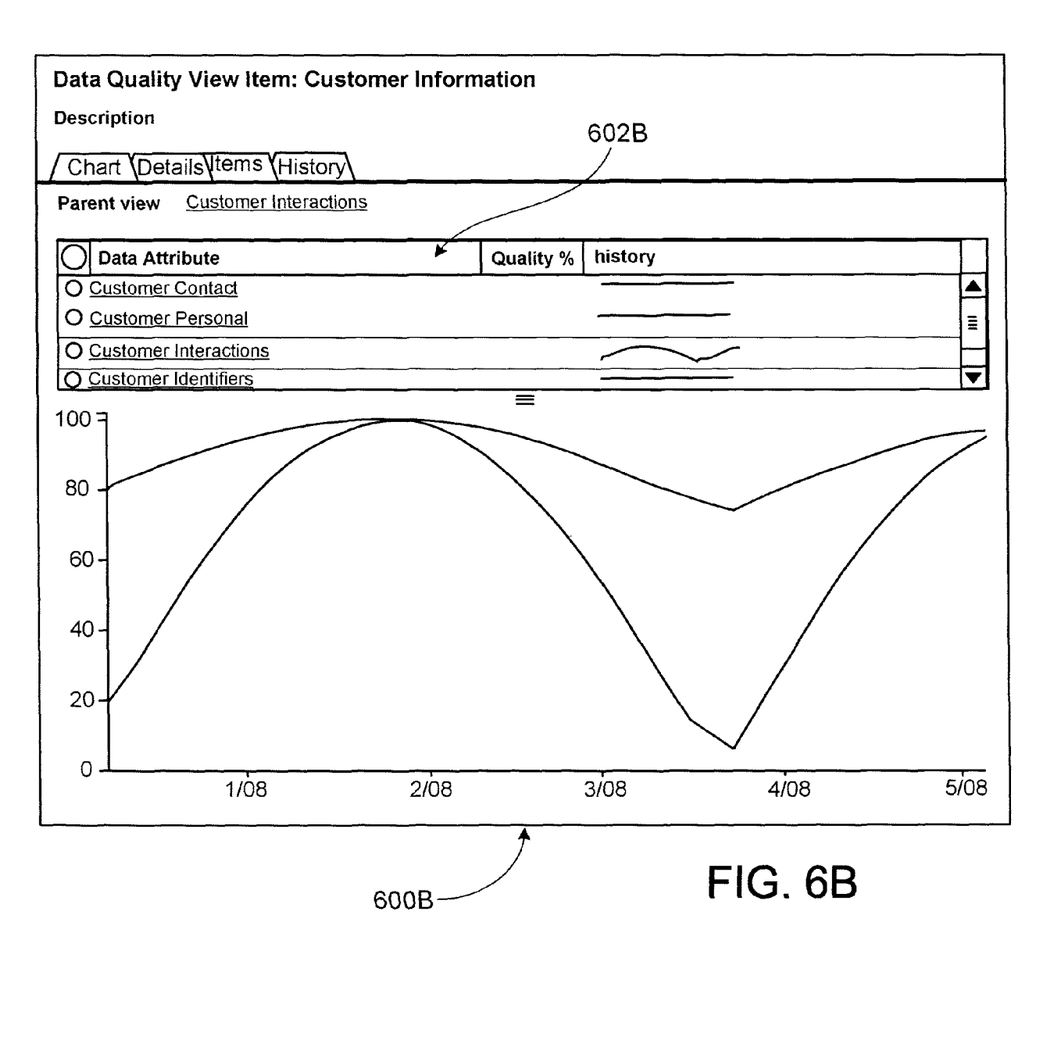
FIG. 6B is a chart based on summary reports.

Multiple data quality metrics can be grouped into a "summary report," an example of which can be seen in FIG. 6B. A summary report includes a rule for summarizing multiple data quality metric values as a single value, such as the method described above relating to hierarchies. Example rules include "maximum", "minimum" and "average". A summary report therefore can also be used to produce a data quality history with values that are, for example, the average of those for all of the data quality metrics contained within the report.

Summary reports can also contain other summary reports, in addition to individual data quality metrics, resulting in a hierarchy of reports, each of which summarizes its elements. Stated differently, metric values for two parent nodes that are subordinate to a third parent node may be used to calculate the metric value of the third parent node.

Given a time series of metric values for each element of a summary report, a time series of metric values for the summary report itself can be calculated. The time series can then be charted and compared to the time series for its components. The summary report "Customer Information" is shown in FIG. 6B. The metrics contained within the summary report are listed in the table above the chart. Each is shown with its latest quality value, a colored dot summarizing that value as described above, and a miniature of the chart corresponding to its history. Selecting one of these miniature charts will superimpose the full-size version of that chart on the chart for "Customer Information". In the illustration, "Customer Interactions" has been selected, and is charted in blue.

The user may wish the time series may include only a subset of the computable metric values, for a number of reasons (e.g., not all computed field profiles may be of interest). Some field profiles may have been computed based on partial data, while some may have been experiments on the way to the final profile result, and still some may have been erroneously computed. The calculation of the time series therefore has some criterion for choosing which field profiles to include. One exemplary criterion is to always choose the latest available field profile for each calendar day (e.g., the most recent field profile). The time of day at which each calendar day is considered to have started can be defined by a user; that is, the definition of a calendar day may be extended to include an arbitrary time boundary between days.

Field profile results depend in part on Validation Specifications which can be changed over time. Therefore each metric value is also annotated with the version of the validation spec that applied to the corresponding field profile.

Individual metric values also depend on the metric specification, which can be changed over time. Therefore each metric value is also annotated with the version of the metric that applied at the time the value was computed.

The approaches described above can be implemented using software for execution on a computer. For instance, the software forms procedures in one or more computer programs that execute on one or more programmed or programmable computer systems (which may be of various architectures, such as distributed, client/server, or grid) each including at least one processor, at least one data storage system (for example, volatile and non-volatile memory and/or storage elements), at least one input device or port, and at least one output device or port. The software may form one or more modules of a larger program, for example, a program that provides other services related to the design and configuration of graphs.

The software may be provided on a medium or device readable by a general or special purpose programmable computer or delivered (encoded in a propagated signal) over a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

It is to be understood that the foregoing description is intended to illustrate and not to limit the scope of the invention, which is defined by the scope of the appended claims. Other embodiments are within the scope of the following claims.

What is claimed is:

1. A method including:
    determining metric values associated with data quality for one or more child nodes;
    determining a metric value for a parent node based on the metric values of at least some of the child nodes, wherein relationships between one or more parent nodes and one or more child nodes define a hierarchy; and
    repeating the determination of the metric value for the parent node for multiple instances of the determination, where, in at least two of the multiple instances, relationships between the parent node and the one or more child nodes used in determining the metric value for the parent node are the same in the at least two instances;
    wherein one or both of the metric values for the one or more child nodes or the metric value for the parent node is determined for each of the multiple instances and stored as a time series that represents the history of that metric value.

2. The method of claim 1 wherein the one or more child nodes used in determining the metric value for the parent node have no child nodes.

3. The method of claim 1 further including generating profiling information that represents characteristics of data represented by the child and parent nodes.

4. The method of claim 3 wherein the metric values for the child nodes are based on the profiling information.

5. The method of claim 1 wherein the arrangement of the hierarchy is specified by a user.

6. The method of claim 3 wherein a user specifies which data fields within the profiling information will affect the determination of the metric values.

7. The method of claim 1 wherein a user selects one or more previously-constructed factors to affect the determination of the metric values.

8. The method of claim 1 wherein the metric values and the metric value are represented as a number from 0 to 100.

9. The method of claim 1 wherein one or both of the metric values for the one or more child nodes or the metric value for the parent node is displayed for each of the multiple instances as a function of the time on a continuous line chart.

10. The method of claim 9 wherein the continuous line chart is automatically generated based on the profiling information.

11. The method of claim 9 wherein the continuous line chart indicates a change in the rules governing the determination of the metric values.

12. The method of claim 9 wherein the continuous line chart indicates a change in the metric values used in the determination of the metric value for the parent node.

13. A computer-readable medium that stores executable instructions for use in obtaining a value from a device signal, the instructions for causing a computer to:
   determine metric values for one or more child nodes;
   determine a metric value for a parent node based on the metric values of at least some of the child nodes, wherein relationships between one or more parent nodes and one or more child nodes define a hierarchy; and
   repeat the determination of the metric value for the parent node for multiple instances of the determination, where, in at least two of the multiple instances, relationships between the parent node and the one or more child nodes used in determining the metric value for the parent node are the same in the at least two instances;
   wherein one or both of the metric values for the one or more child nodes or the metric value for the parent node is determined for each of the multiple instances and stored as a time series that represents the history of that metric value.

14. The computer-readable medium of claim 13 wherein the one or more child nodes used in determining the metric value for the parent node have no child nodes.

15. The computer-readable medium of claim 13 further including generating profiling information that represents characteristics of data represented by the child and parent nodes.

16. The computer-readable medium of claim 15 wherein the metric values for the child nodes are based on the profiling information.

17. The computer-readable medium of claim 13 wherein the arrangement of the hierarchy is specified by a user.

18. The computer-readable medium of claim 15 wherein a user specifies which data fields within the profiling information will affect the determination of the metric values.

19. The computer-readable medium of claim 13 wherein a user selects one or more previously-constructed factors to affect the determination of the metric values.

20. The computer-readable medium of claim 13 wherein the metric values and the metric value are represented as a number from 0 to 100.

21. The computer-readable medium of claim 13 wherein one or both of the metric values for the one or more child nodes or the metric value for the parent node is displayed for each of the multiple instances as a function of the time on a continuous line chart.

22. The computer-readable medium of claim 21 wherein the continuous line chart is automatically generated based on the profiling information.

23. The computer-readable medium of claim 21 wherein the continuous line chart indicates a change in the rules governing the determination of the metric values.

24. The computer-readable medium of claim 21 wherein the continuous line chart indicates a change in the metric values used in the determination of the metric value for the parent node.

25. A system including:
   means for determining metric values for one or more child nodes;
   means for determining a metric value for a parent node based on the metric values of at least some of the child nodes, wherein relationships between one or more parent nodes and one or more child nodes define a hierarchy; and
   means for repeating the determination of the metric value for the parent node for multiple instances of the determination, where, in at least two of the multiple instances, relationships between the parent node and the one or more child nodes used in determining the metric value for the parent node are the same in the at least two instances;
   wherein one or both of the metric values for the one or more child nodes or the metric value for the parent node is determined for each of the multiple instances and stored as a time series that represents the history of that metric value.

* * * * *